United States Patent
Alanazi et al.

(10) Patent No.: US 12,186,682 B2
(45) Date of Patent: Jan. 7, 2025

(54) RESTORING ACCUMULATED DGA WITH RECLAIMER SPARGE LINE

(71) Applicant: Saudi Arabian Oil Company, Dhahran (SA)

(72) Inventors: Majed Fehaid Alanazi, Dammam (SA); Abdullah Al-Abbad, Al-Ahsa (SA); Mosa H. Sahari, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 394 days.

(21) Appl. No.: 17/457,609

(22) Filed: Dec. 3, 2021

(65) Prior Publication Data
US 2023/0173410 A1 Jun. 8, 2023

(51) Int. Cl.
*B01D 19/00* (2006.01)
*B01D 53/14* (2006.01)
*B01D 53/96* (2006.01)

(52) U.S. Cl.
CPC ....... *B01D 19/001* (2013.01); *B01D 53/1425* (2013.01); *B01D 53/1493* (2013.01); *B01D 53/96* (2013.01); *B01D 2252/20484* (2013.01)

(58) Field of Classification Search
CPC .............. B01D 19/001; B01D 53/1425; B01D 53/1493
See application file for complete search history.

(56) References Cited

U.S. PATENT DOCUMENTS

| | | | |
|---|---|---|---|
| 4,208,541 A | 6/1980 | McClure | |
| 9,994,512 B2* | 6/2018 | Aboudheir | ......... B01D 53/1493 |
| 10,456,749 B2 | 10/2019 | Handagama et al. | |
| 11,819,777 B2* | 11/2023 | Andrian | ................... G05D 9/12 |

FOREIGN PATENT DOCUMENTS

GB 2102019 1/1983

OTHER PUBLICATIONS

Al-Zahrani et al., "Methodology of Mitigating Corrosion Mechanisms in Amine Gas Treating Units," Paper 06641, Corrosion NACExpo, 2006, 12 pages.
Cummings et al., "Advances in amine reclaiming—why there's no excuse to operate a dirty amine system," presented at Laurance Reid Gas Conditioning Conference, Feb. 27, 2007, 19 pages.

* cited by examiner

*Primary Examiner* — Robert A Hopkins
(74) *Attorney, Agent, or Firm* — Fish & Richardson P.C.

(57) ABSTRACT

Systems and methods for converting BHEEU to DGA are provided. An exemplary system includes an amine unit; a reclaimer configured to receive a lean DGA stream including BHEEU and DGA exiting the amine unit and a reclaimer steam stream to convert at least a portion of the BHEEU to DGA; a sparge line connected a steam source and to the reclaimer configured to introduce sparge steam to restore accumulated DGA at the bottom of the reclaimer, and an output stream comprising DGA.

9 Claims, 5 Drawing Sheets

RESTORING ACCUMULATED DGA WITH RECLAIMER SPARGE LINE

TECHNICAL FIELD

The present disclosure relates to restoring 2-(2-aminoethoxy) ethanol accumulated in a reclaimer using a sparge line.

BACKGROUND

Gas processing facilities include "sweetening" processes to process a sour gas feed stream to remove acid gas and produce sales gas and natural gas liquids (NGL). Sour gas is typically natural gas containing significant amounts of acid gas, such as hydrogen sulfide or carbon dioxide. Sales gas may include methane, ethane, and ethylene. NGL are low boiling point hydrocarbons such as propane, butanes, and small amounts of higher molecular weight hydrocarbons, such as C5 and C5 plus.

The acid gas is removed in a gas treating unit. One type of gas treating unit is an amine unit, where one medium for acid gas removal is 2-(2-aminoethoxy) ethanol, also known by the trademarked names DIGLYCOLAMINE® or DGA®. In such a process, DGA can degrade to N,N-bis (hydroxyethoxyethyl) urea (BHEEU). BHEEU, however, can be converted back to DGA under certain conditions and recirculated to the amine unit.

SUMMARY

Certain aspects of the invention are implemented as a system for converting BHEEU to DGA. The system includes an amine unit; a reclaimer configured to receive a lean DGA stream comprising BHEEU and DGA exiting the amine unit and a reclaimer steam stream to convert at least a portion of the BHEEU to DGA; a sparge line connected a steam source and to the reclaimer configured to introduce sparge steam to restore accumulated DGA at the bottom of the reclaimer; and an output stream comprising DGA.

Certain aspects of the invention are implemented as a method for converting BHEEU to DGA. The method includes directing a lean DGA stream comprising BHEEU and DGA from an amine unit to a reclaimer; directing a reclaimer steam stream to the reclaimer to convert at least a portion of the BHEEU to DGA; directing to the reclaimer a sparge steam stream from a sparge line to restore accumulated DGA at the bottom of the reclaimer; and recovering from the reclaimer an output stream comprising DGA.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

Gas processing facilities can include processes to process sour gas to remove acid gas and produce sales gas and NGL. The acid gas is removed in the gas treating unit. One type of gas treating unit is an amine unit, where one medium for acid gas removal is DGA. In such a process, DGA can be lost to degradation products such as BHEEU through the following reversible reaction:

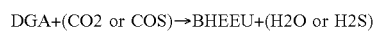

Unlike DGA's other degradation products, BHEEU can be converted back to DGA by reversing the above reaction, which occurs at a temperature of at least 360° F.

Processes can implement a reclaimer to convert BHEEU to DGA so DGA can be recycled into the amine unit. Prior reclaimers have relied on reclaimer steam lines to introduce steam as a source of heat to convert BHEEU to DGA. These traditional steam lines, however, have caused a low thermal efficiency in the reclaimer for various reasons. For example, the steam lines may become blocked or scale may form the outlet walls of steam lines. Traditional steam lines may also be unable to provide sufficient steam flow rates for optimal conversion.

The low thermal efficiency decreases the conversion of BHEEU to DGA. Further, the evaporation rate of the converted DGA solution is reduced. Thus, even where the DGA is converted, the DGA may accumulate in the reclaimer bottom, preventing or delaying recovery.

Reclaimers may also include a sparge line, but these mainly have been used during reclaimer shutdown to evaporate the reclaimer content before equipment isolation. This use has been manual, meaning that an operator has been required to open the line to introduce steam into the reclaimer.

The subject matter described in this specification can be implemented in particular implementations, to realize one or more of the following advantages. In some implementations, the steam from the sparge line agitates stagnant DGA in the bottom of the reclaimer, decreasing DGA accumulation. In some implementations, a sparge line is also used to introduce heat in addition to traditional reclaimer steam lines, increasing BHEEU conversion and DGA evaporation. In some implementations, using the sparge line also prevents settling of sludge and solid materials (such as BHEEU, other DGA degradation products such as iron sulfide, polymeric waxes, anti-foam materials, dirt, and scale) at the bottom of the reclaimer. This decreases the corrosion rate that results by accumulating such materials. In some implementations, the sparge line increases the concentration of output DGA by up to 1%.

Figure 1:
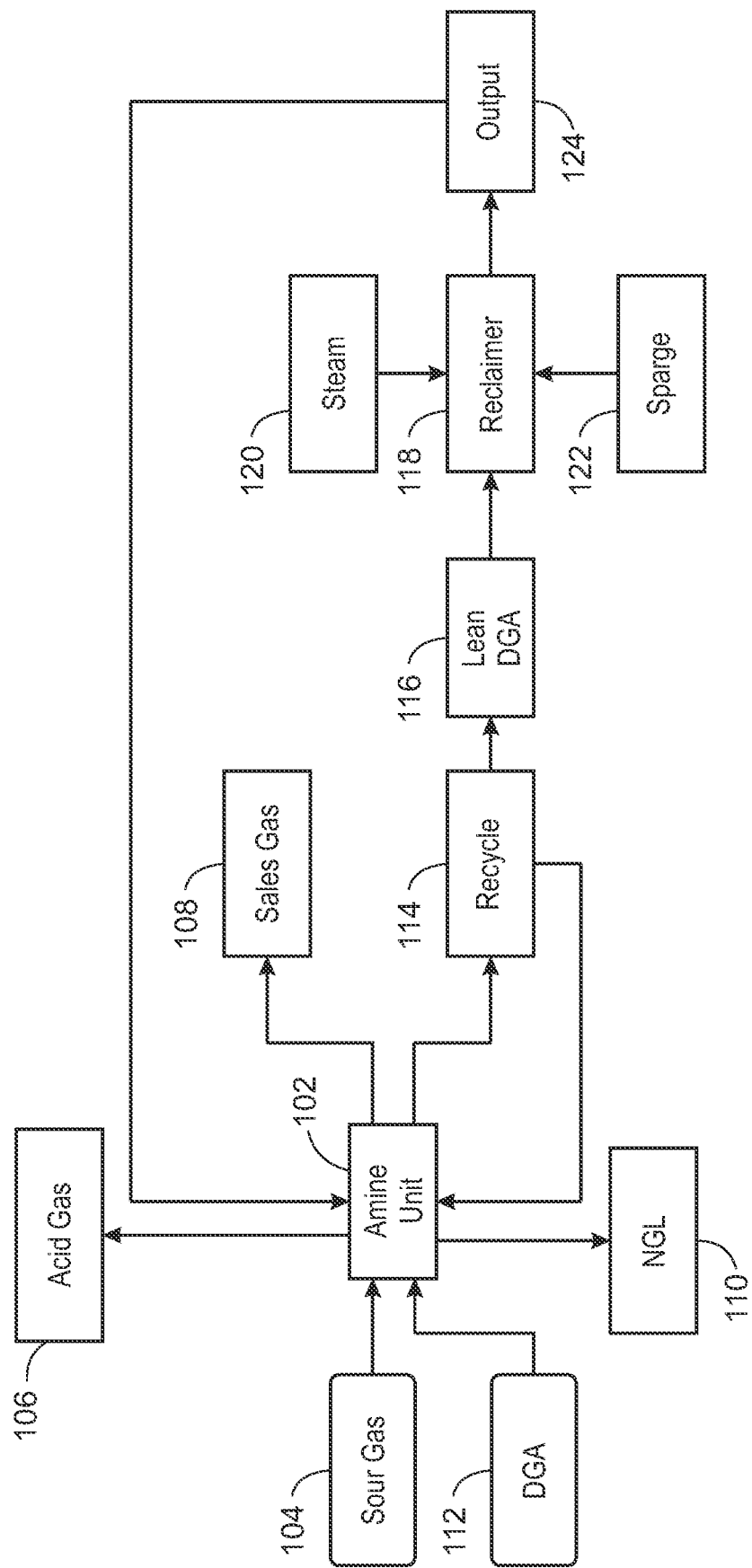
FIG. 1 is a block diagram of an example system for restoring accumulated DGA.

FIG. 1 is a block diagram of an example process which implements a reclaimer to convert BHEEU to DGA. The amine unit 102 processes sour gas 104, removing acid gas 106 to produce sales gas 108 and NGL 110. The primary medium for separation is DGA 112. In some implementations, after separation, the acid gas 106, sales gas 108, and NGL 110 are sold, discarded, further purified, or implemented elsewhere in the facility as feedstock.

The amine unit further includes a recycle stream 114 of DGA. The recycle stream 114 also includes DGA degradation products such as BHEEU.

A lean DGA stream 116 of DGA and BHEEU is split off the recycle stream 114 and sent to a reclaimer 118. In one implementation, the lean DGA stream 116 is 2 vol. % of the recycle stream 114 and 45 to 50 vol. % DGA. The reclaimer 118 converts BHEEU back to DGA by achieving an adequate reaction temperature. The reaction temperature is achieved using a reclaimer steam stream 120. A sparge steam stream 122 restores accumulated DGA at the bottom of the reclaimer. In some implementations, the sparge steam stream 122 is an additional source of heat to convert BHEEU back to DGA. After conversion, an output stream 124 of DGA is sent back to the amine unit 102 to process sour gas 104. In some implementations, the output DGA stream contains water and is 45 to 50 vol. % DGA. In some implementations, the streams of FIG. 1 are flowed between elements using conduits, such as pipes.

Figure 2:
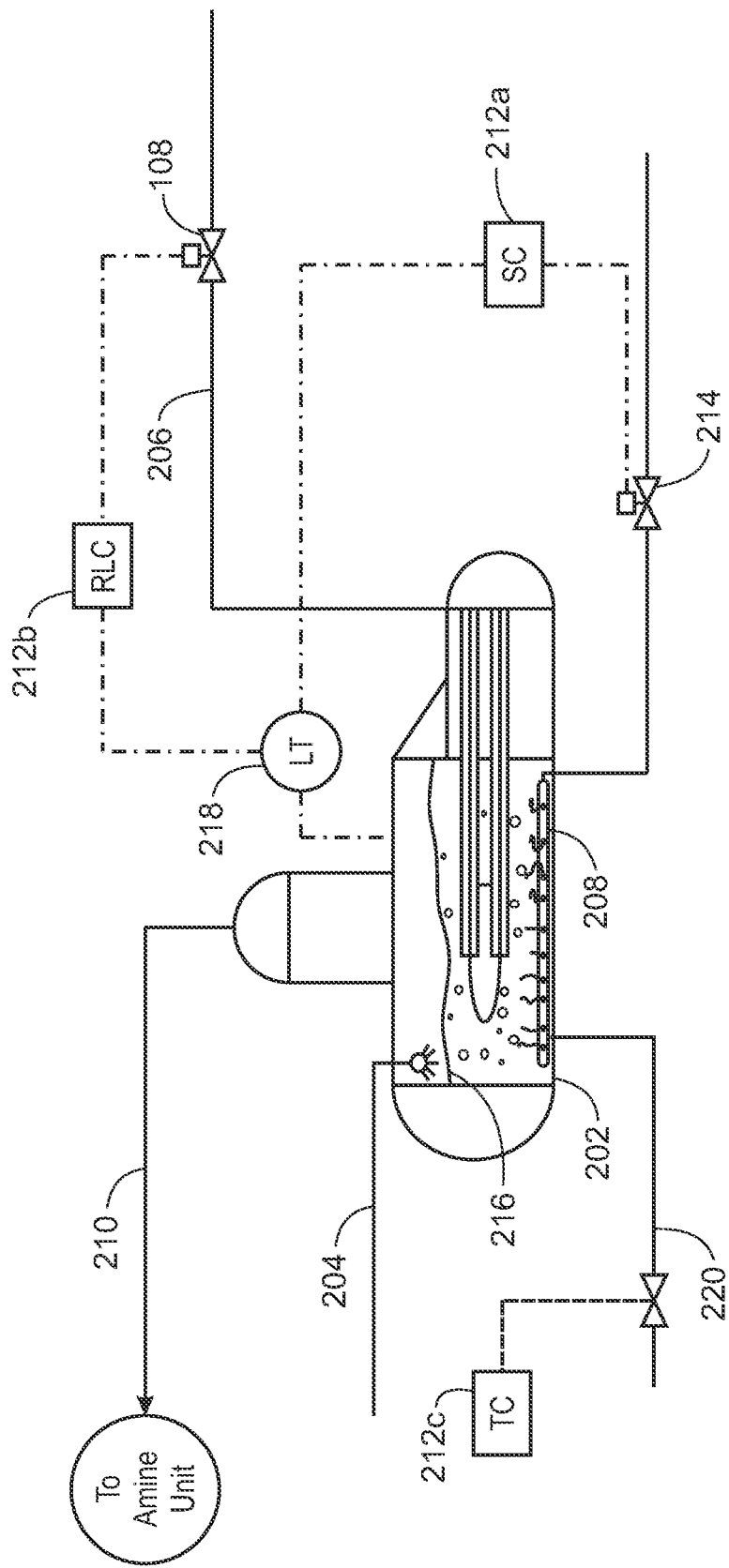
FIG. 2 is a process flowsheet of an example reclaimer implementing a sparge line to restore accumulated DGA.

FIG. 2 is a process flow sheet of reclaimer implementing a sparge steam line to restore accumulated DGA at the bottom of the reclaimer.

The reclaimer 202 receives a lean DGA line 204 of DGA and BHEEU. The reclaimer 202 further includes a reclaimer steam line 206 and a sparge steam line 208. The reclaimer steam line 206 introduces steam to convert BHEEU to DGA. The sparge steam line 208 restores accumulated DGA at the bottom of the reclaimer. In one implementation, the sparge steam line 208 introduces steam to convert BHEEU to DGA. The DGA is evaporated in the reclaimer 202 and recovered as an output stream 210 of DGA. The output stream 210 is then sent to the amine unit 102 as a separation medium.

In the example of FIG. 2, the reclaimer 202 includes controllers 212 to automate the reclaimer operation. A sparge controller 212a is connected to the sparge steam line 208. The sparge controller 212a regulates the amount of steam entering through the sparge steam line 208 connected to a steam source with a sparge valve 214. In some implementations, the sparge controller 212a is configured to open the sparge valve 214 and introduce sparge steam to the reclaimer 202 if the reclaimer level 218 exceeds 63% or if the DGA concentration in the reclaimer bottom exceeds 45 vol. %.

In the implementation of FIG. 2, the reclaimer 202 further includes a reclaimer level controller 212b connected to the reclaimer steam line 206. The reclaimer level controller 212b measures the reclaimer level 216 using a level transmitter 218 and manipulates reclaimer steam flow to maintain an appropriate reclaimer level 216. In addition, the temperature in the reclaimer 202 is controlled by a temperature controller 212c, where reflux water flow 220 to the reclaimer 202 is adjusted according to the temperature in the reclaimer 202 to avoid overheating.

In some implementations, reclaimer is a kettle type heat exchanger operated at one or more of the following conditions. The reclaimer level is maintained around 50% to 63% of its total volume capacity. The reclaimer is operated at around 355 to 360° F. and 16 to 19 psig. The reclaimer steam stream has a pressure of from 340 to 375 psig. The sparge steam stream has a pressure of around 75 psig. The reclaimer is operated at around 355 to 360° F. The lean DGA stream is flowed to the reclaimer at around 20 to 168 gallons per minute. The reclaimer steam stream is flowed to the reclaimer at around 15 to 25 thousand pounds per hour. The output stream is around 45 to 50 vol. % DGA. In some implementations, the controllers are connected or consolidated into a single controller. In some implementations, steam is introduced through multiple reclaimer steam lines and sparge steam lines. The reclaimer streams are directed and from to the reclaimer by conduits, such as pipes.

Figure 3:
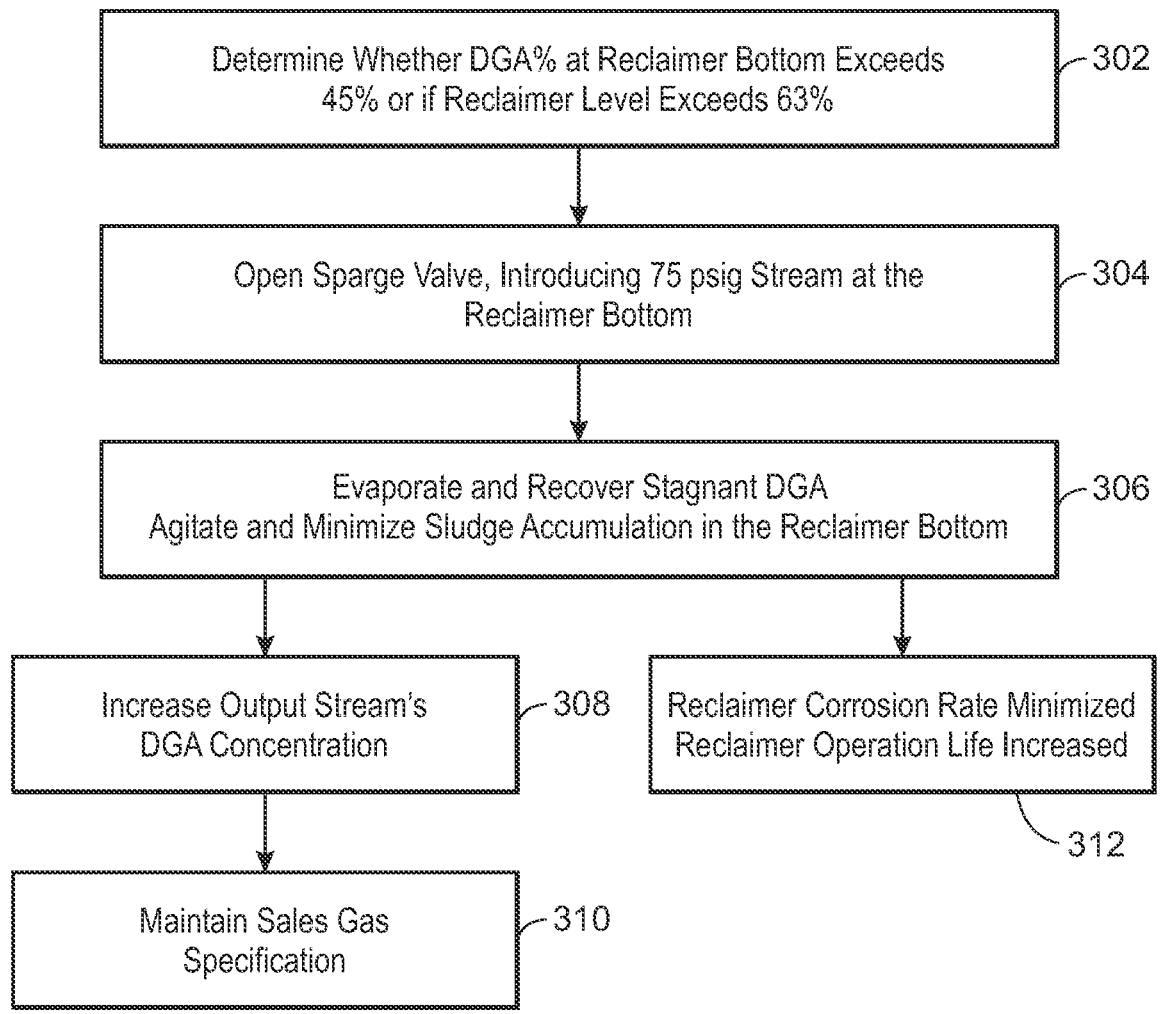
FIG. 3 is a block flow diagram of an example implementation of the reclaimer of FIG. 2.

FIG. 3 is a block flow diagram of an example implementation of the reclaimer of FIG. 2. At block 302, the sparge controller determines whether the DGA concentration at the reclaimer bottom exceeds 45% or if the reclaimer level exceeds 63% 302. At block 304, either condition is satisfied and the sparge controller opens the sparge valve, introducing 75 psig steam at the reclaimer bottom. At block 306, the sparge line steam evaporates and recovers stagnant DGA and agitates and minimizes sludge accumulation in the reclaimer bottom. This increases the concentration of DGA in the output stream at block 308, allowing the process to maintain the sales gas specification at block 310. At block 312, the reclaimer corrosion rate is minimized and the reclaimer operation life is increased.

Figure 4:
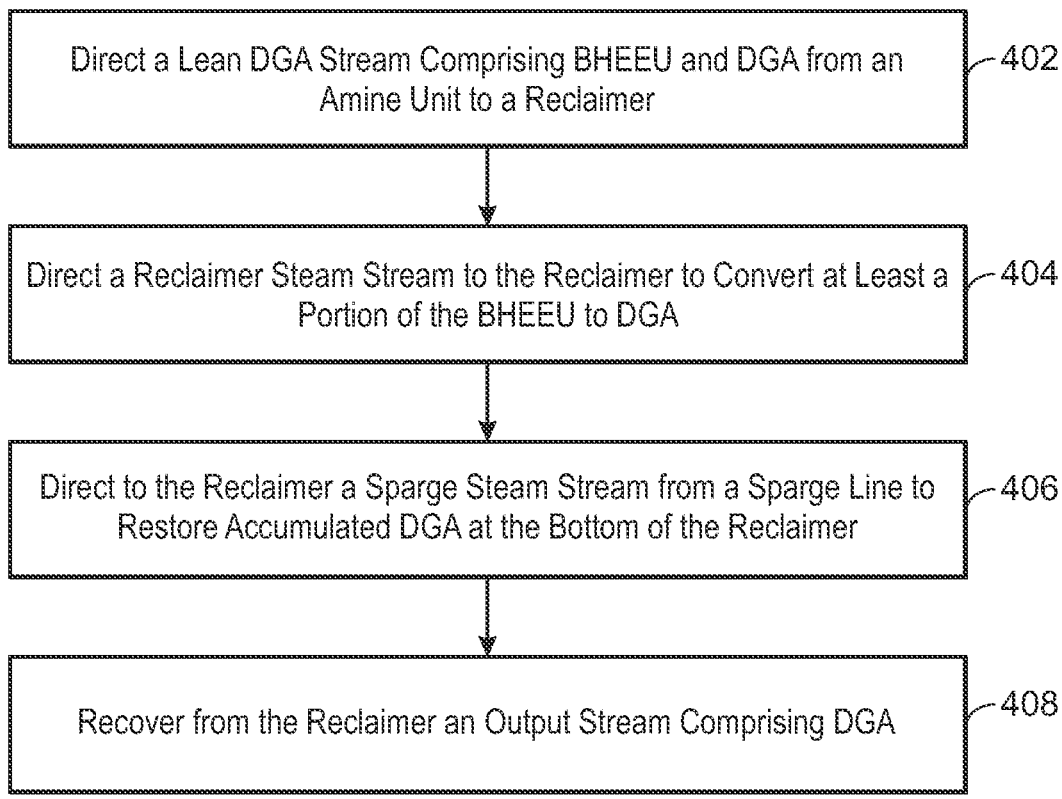
FIG. 4 is a flow chart of an example method for using a sparge line to restore accumulated DGA.

FIG. 4 is a flow chart of an example method for using a sparge line to convert BHEEU to DGA. At block 402, a lean DGA stream comprising BHEEU and DGA is directed from an amine unit to a reclaimer. At block 404, a reclaimer steam stream is directed to the reclaimer to convert at least a portion of the BHEEU to DGA. At block 406, a sparge steam stream is directed to the reclaimer from a sparge line to restore accumulated DGA at the bottom of the reclaimer. At block 408, an output stream comprising DGA is recovered from the reclaimer.

Figure 5:
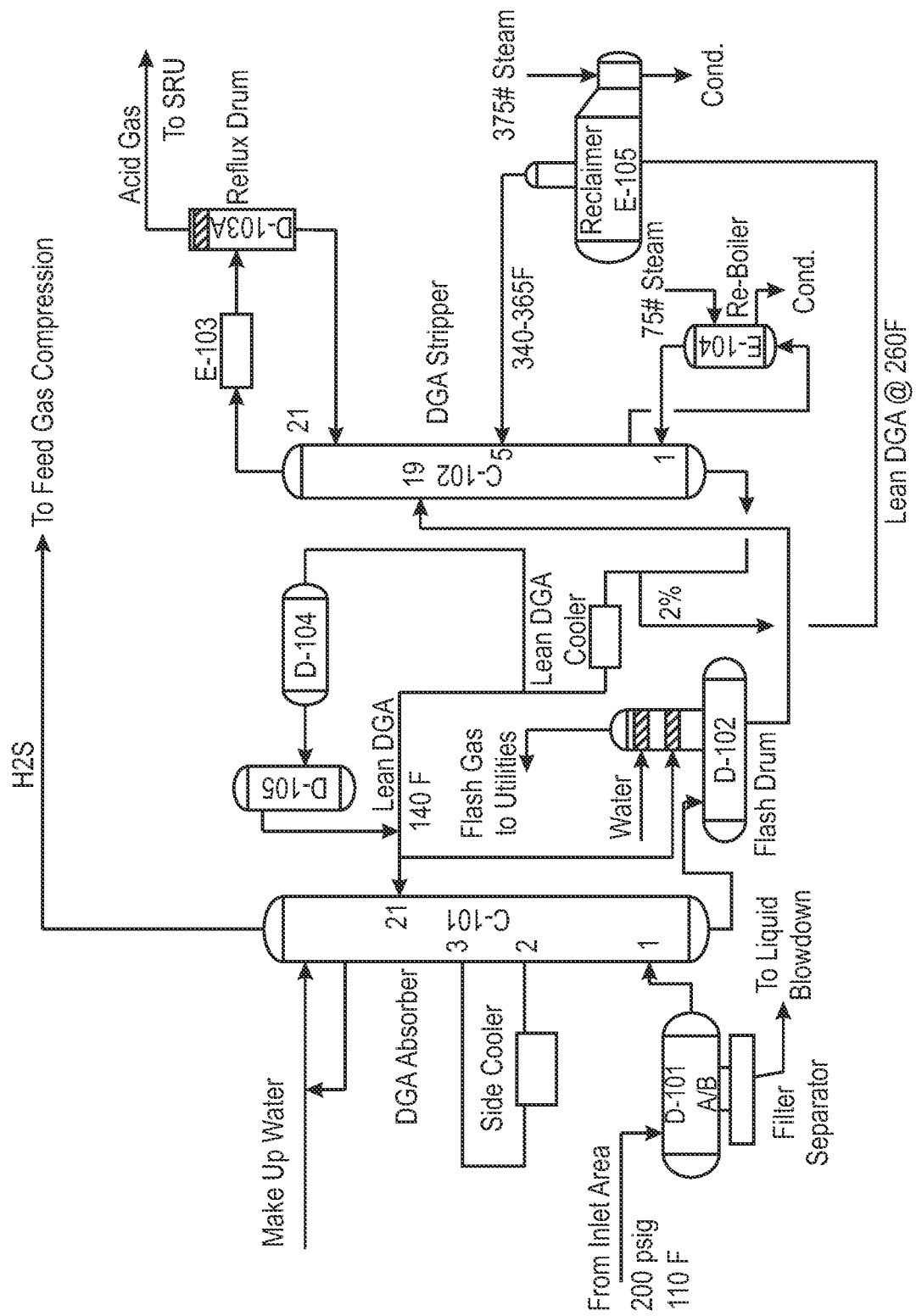
FIG. 5 is a process flowsheet for an example gas processing facility including a reclaimer.

FIG. 5 is a simplified process flow diagram of a process of gas treatment including a reclaimer.

EXAMPLE 1 (LEAN DGA CONCENTRATION BEFORE AND AFTER IMPLEMENTING THE SPARGE LINE)

Table 2 summarizes the results of implementing a sparge line as a source of steam in two gas treatment plants.

|  | Date | Output Stream (DGA vol. %) | Reclaimer Bottom (DGA vol. %) |
|---|---|---|---|
| Plant 1 | Feb. 25, 2021 | 43.5 | 49.8 |
|  | Feb. 28, 2021 | 44.3 | No Sample Taken |
|  | Mar. 4, 2021 | 44.4 | No Sample Taken |
|  | Mar. 7, 2021 | 45.5 | 46.6 |
| Plant 2 | Mar. 28, 2021 | 42.7 | 39.5 |
|  | Mar. 29, 2021 | 44.2 | No Sample Taken |
|  | Apr. 1, 2021 | 45.0 | No Sample Taken |
|  | Apr. 4, 2021 | 45.4 | 31.5 |

In Plant 1, from Feb. 25, 2021 to Mar. 7, 2021, a sparge line was used to enhance the DGA concentration in the system. The results show that the percent of DGA in the output stream increased from 43.5 vol. % to 45.5 vol. % and the percent of DGA accumulated in the reclaimer bottom decreased from 49.8 vol. % to 46.6 vol. %. This means that the sparge line restored accumulated DGA from the reclaimer bottom. The test was repeated in Plant 2, from Mar. 28, 2021 to Apr. 4, 2021. As seen, the results similarly show that the sparge line successfully increased the percent of DGA in the output stream and decreased the accumulated DGA in the reclaimer bottom.

Described implementations of the subject matter can include one or more features, alone or in combination. For example, an implementation is a system for converting BHEEU to DGA. The system includes an amine unit; a reclaimer configured to receive a lean DGA stream including BHEEU and DGA exiting the amine unit and a reclaimer steam stream to convert at least a portion of the BHEEU to DGA; a sparge line connected a steam source and to the reclaimer configured to introduce sparge steam to restore accumulated DGA at the bottom of the reclaimer; and an output stream comprising DGA.

The foregoing and other described implementations can each, optionally, include one or more of the following features:

A sparge valve connected to the sparge line; and a sparge controller configured to open the sparge valve and introduce sparge steam to the reclaimer if the reclaimer level exceeds 63% or if the DGA concentration in the reclaimer bottom exceeds 45 vol. %.

The amine unit includes a recycle stream and the lean DGA stream includes about 2 vol. % of the recycle stream.

The reclaimer is a kettle type heat exchanger.

The reclaimer level is around 50% to 63%.

A reclaimer level controller configured to maintain the reclaimer level.

The reclaimer steam stream has a pressure of around 375 psig.

The sparge steam has a pressure of around 75 psig.

The reclaimer temperature is around 355 to 360° F. and reclaimer pressure is around 16 to 19 psig.

A temperature controller configured to maintain the reclaimer temperature.

A second implementation is a method for converting BHEEU to DGA. The method includes directing a lean DGA stream including BHEEU and DGA from an amine unit to a reclaimer; directing a reclaimer steam stream to the reclaimer to convert at least a portion of the BHEEU to DGA; directing to the reclaimer a sparge steam stream from a sparge line to restore accumulated DGA at the bottom of the reclaimer; and recovering from the reclaimer an output stream comprising DGA.

The foregoing and other described implementations can each, optionally, include one or more of the following features:

Connecting a sparge valve to the sparge line; and configuring a sparge controller to open the sparge valve and introduce sparge steam to the reclaimer if the reclaimer level exceeds 63% or if the DGA concentration in the reclaimer bottom exceeds 45 vol. %.

Flowing a recycle stream from the amine unit; separating 2 vol. % of the recycle stream to use as the lean DGA stream; and directing the recycle stream to the amine unit.

The reclaimer is a kettle type heat exchanger.

The reclaimer level is around 50% to 63%.

Flowing the reclaimer steam stream to the reclaimer at around 375 psig.

Flowing the sparge steam to the reclaimer at around 75 psig.

Operating the reclaimer at around 355 to 360° F.

Flowing the lean DGA stream to the reclaimer at around 20 to 168 gallons per minute.

Flowing the reclaimer steam stream to the reclaimer at around 15 to 25 thousand pounds per hour.

The reclaimer is operated at around 355 to 360° F. and around 16 to 19 psig.

A sparge steam stream converts at least a portion of the BHEEU to DGA.

Thus, particular implementations of the subject matter have been described. Other implementations are within the scope of the following claims.

What is claimed is:

1. A system for converting BHEEU to DGA comprising:
   an amine unit;
   a reclaimer configured to receive a lean DGA stream comprising BHEEU and DGA exiting the amine unit and a reclaimer steam stream to convert at least a portion of the BHEEU to DGA;
   a reclaimer steam line configured to flow the reclaimer steam stream to the reclaimer;
   a sparge line connected to a steam source and to the reclaimer, wherein the sparge line is configured to introduce sparge steam to restore accumulated DGA at a bottom of the reclaimer;
   an output stream comprising DGA;
   a level transmitter configured to measure a reclaimer level in the reclaimer;
   a sparge valve connected to the sparge line;
   a sparge controller communicatively coupled to the sparge valve and the level transmitter, wherein the sparge controller is configured to open the sparge valve and introduce sparge steam through the sparge line to the reclaimer in response to the reclaimer level exceeding 63%; and
   a reclaimer level controller connected to the reclaimer steam line, wherein the reclaimer level controller is communicatively coupled to the level transmitter, wherein the reclaimer level controller is configured to adjust the flow of the reclaimer steam stream to the reclaimer to maintain the reclaimer level.

2. The system of claim 1,
   wherein the sparge controller is configured to open the sparge valve and introduce sparge steam to the reclaimer in response to a DGA concentration in the reclaimer bottom exceeding 45 vol. %.

3. The system of claim 1, wherein the amine unit further comprises a recycle stream and wherein the lean DGA stream comprises about 2 vol. % of the recycle stream.

4. The system of claim 1, wherein the reclaimer is a kettle type heat exchanger.

5. The system of claim 1, wherein the reclaimer level is around 50% to 63%.

6. The system of claim 1, wherein the reclaimer steam stream has a pressure of around 375 psig.

7. The system of claim 1, wherein the sparge steam has a pressure of around 75 psig.

8. The system of claim 1, wherein the reclaimer temperature is around 355 to 360° F. and reclaimer pressure is around 16 to 19 psig.

9. The system of claim 8, further comprising a temperature controller configured to adjust a rate of reflux water flow to the reclaimer to maintain the reclaimer temperature.

* * * * *